(12) United States Patent
Yen et al.

(10) Patent No.: US 8,233,787 B2
(45) Date of Patent: Jul. 31, 2012

(54) FOCUS METHOD AND PHOTOGRAPHIC DEVICE USING THE METHOD

(75) Inventors: Chih-Pin Yen, Hsinchu (TW); Chia-Lun Tsai, Hsinchu (TW); Li-Wen Kuo, Hsinchu (TW)

(73) Assignee: Altek Corporation, Hsinchu (TW)

( * ) Notice: Subject to any disclaimer, the term of this patent is extended or adjusted under 35 U.S.C. 154(b) by 0 days.

(21) Appl. No.: 12/963,760

(22) Filed: Dec. 9, 2010

(65) Prior Publication Data

US 2011/0194848 A1  Aug. 11, 2011

(30) Foreign Application Priority Data

Feb. 11, 2010 (TW) .............................. 99104509 A

(51) Int. Cl.
*G03B 17/00* (2006.01)
*G03B 3/00* (2006.01)
*G03B 13/00* (2006.01)
*H04N 5/262* (2006.01)
*H04N 2/232* (2006.01)
*G02B 7/04* (2006.01)

(52) U.S. Cl. ........ 396/80; 396/104; 396/125; 348/240.3; 348/353; 250/201.7

(58) Field of Classification Search .................... 396/80, 396/79, 85, 87, 104, 125–128; 348/240.99, 348/240.3, 345, 353; 250/201.2, 201.4, 201.7
See application file for complete search history.

(56) References Cited

U.S. PATENT DOCUMENTS

2005/0185084 A1 * 8/2005 Nonaka et al. ................ 348/345

* cited by examiner

*Primary Examiner* — Rochelle-Ann J Blackman
(74) *Attorney, Agent, or Firm* — Alan Kamrath; Kamrath IP Lawfirm, PA

(57) ABSTRACT

A photographic device using a focus method includes a zoom lens, an image analyzing module, a focus distance providing module and a processing module. The zoom lens is used for capturing image information of a plurality of positions. The image analyzing module is used for analyzing contrast values of the image information of the plurality of positions. The focus distance providing module is used for providing a non-equivalent and a constant focus distance interval for capturing the image information of the plurality of positions. The processing module is electrically connected with the zoom lens, the image analyzing module, and the focus distance providing module. Whereby, the photographic device acquires the image information of the plurality of positions by the non-equivalent focus distance interval, acquires a coarse focus position, and acquires an accurate focus position by the constant focus distance according to the coarse focus position.

7 Claims, 4 Drawing Sheets

FOCUS METHOD AND PHOTOGRAPHIC DEVICE USING THE METHOD

BACKGROUND OF THE INVENTION

1. Field of the Invention

The present invention relates to a focus method and a photographic device. More particularly, the present invention relates to a focus method and a photographic device that can focus fast and precisely.

2. Description of the Related Art

In existing technology, an S0 continuous focus mode of a digital camera is used to calculate contrast values of a farther position and a closer position relative to a present position, and the contrast value represents the clearness of an image. If the present position has the highest contrast value, which indicates that an accurate focus position is within a scanning area, the photographic device applies a polynomial approximation method to calculate the accurate focus position. If the farther position or the closer position has the highest contrast value, the photographic device continues to calculate the position which is farther than the farther position or closer than the closer position relative to the photographic device until the contrast value decreases. The photographic device applies a polynomial approximation method to calculate the accurate focus position. When the photographic device detects the accurate focus position, the photographic device records the contrast value of the accurate focus position in order to identify whether the accurate focus position has changed or not. If the accurate focus position has changed, the photographic device launches the S0 continuous focus mode again, and if the accurate focus position has not changed, the photographic device does not perform anything.

When the photographic device detects the accurate focus position, the photographic device applies a moving interval. However, whether the photographic device applies a longer or a shorter moving interval, there are drawbacks. A longer moving interval will cause unstable vibration and resultant imprecise focusing. A shorter moving interval causes slow focusing, especially in the case of a great difference between the beginning position and the accurate focus position. Because it takes time to acquire each of the frames in the S0 continuous focus mode, focusing at a long distance consumes a great amount of time.

Therefore, there is a need to provide a method for arranging schedules and a computer using the same to mitigate and/or obviate the aforementioned problems.

SUMMARY OF THE INVENTION

It is an object of the present invention to provide a focus method and a photographic device decreasing the time that the photographic device takes when using the S0 continuous focus mode.

To achieve the abovementioned object, the focus method of the present invention is used for a photographic device having a zoom lens. The method comprises the following steps: detecting a beginning position of the zoom lens; acquiring image information of the beginning position, image information of the first position, and image information of the second position with the zoom lens, with the first position being relative to the beginning position and away from the photographic device, and with the second position being relative to the beginning position and close to the photographic device; determining which one has the highest contrast value among the image information of the beginning position, the image information of the first position, and the image information of the second position; if the image information of the beginning position has the highest contrast value, detecting an accurate focus position with the zoom lens according to the beginning position; if the image information of the first position has the highest contrast value, detecting the accurate focus position with the zoom lens with a non-equivalent distance away from the photographic device according to the first position; and if the image information of the second position has the highest contrast value, detecting the accurate focus position with the zoom lens with the non-equivalent distance close to the photographic device according to the second position.

To achieve the abovementioned object, the photographic device comprises a zoom lens, an image analyzing module, a focus distance providing module, and a processing module. The zoom lens is used for acquiring image information of a plurality of positions. The image analyzing module is used for analyzing contrast values of the image information of the plurality of positions. The focus distance providing module is used for providing a non-equivalent focus distance interval and a constant focus distance interval. The processing module is electrically connected with the zoom lens, the image analyzing module, and the focus distance providing module. When the processing module controls the focus lens to perform a focus operation, the zoom lens acquires the image information of the plurality of positions by the non-equivalent focus distance interval, acquires a coarse focus position, and acquires an accurate focus position by the constant focus distance according to the coarse focus position.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, similar reference numerals denote similar elements throughout the several views.

DETAILED DESCRIPTION OF THE PREFERRED EMBODIMENTS

The following detailed description will present preferred embodiments of the invention in reference to the accompanying drawings, in which well-known functions or constructions will not be described in detail since doing so would unnecessarily obscure the understanding of the invention.

Figure 1:
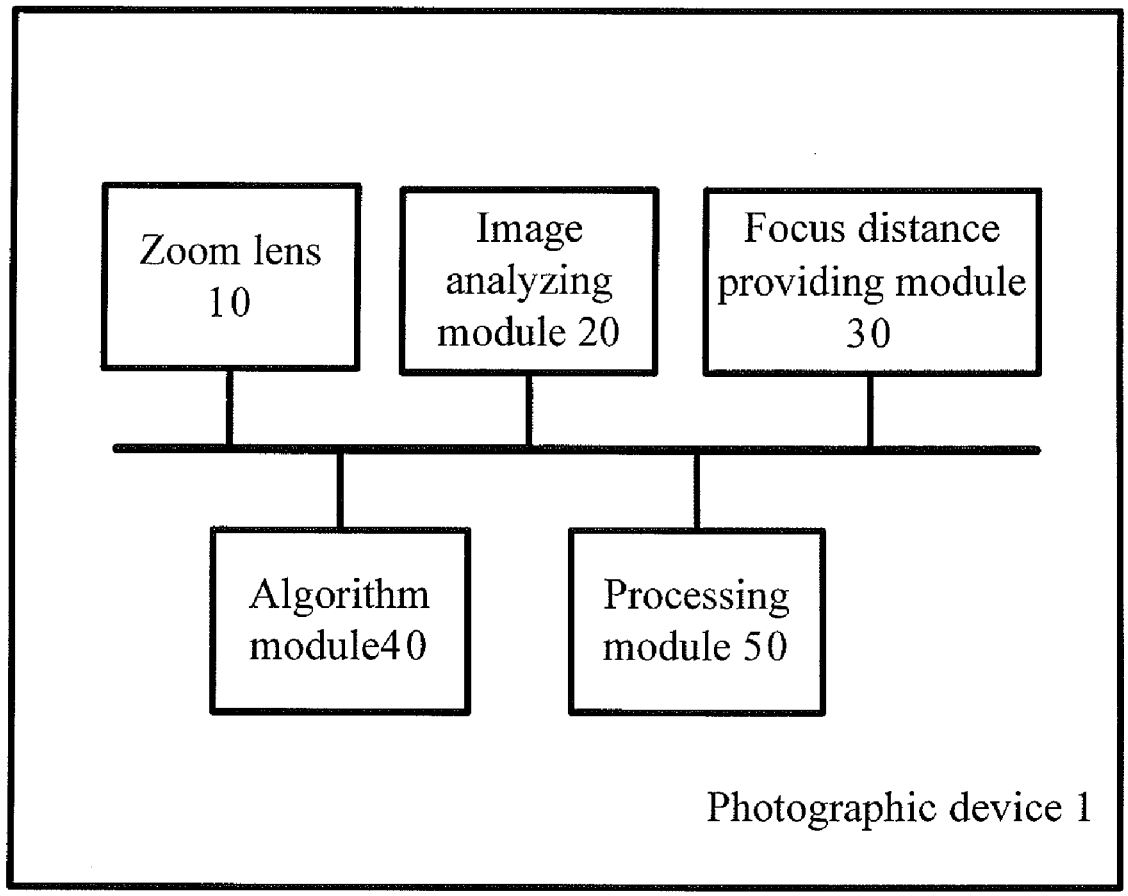
FIG. 1 illustrates a hardware architecture of a photographic device according to one embodiment of the present invention.

Please refer to FIG. 1 of a photographic device according to one embodiment of the present invention. FIG. 1 illustrates a hardware structure of the photographic device according to one embodiment of the present invention.

As shown in FIG. 1, the photographic device 1 of the present invention comprises a zoom lens 10, an image analyzing module 20, a focus distance providing module 30, an algorithm module 40 and a processing module 50. The zoom lens 10 is used for acquiring image information of a plurality of positions. The image analyzing module 20 is used for analyzing contrast values of the image information of the plurality of positions. The focus distance providing module 30 is used for providing a non-equivalent focus distance interval and a constant focus distance interval. The algorithm module 40 is used for providing an algorithm and calculating an accurate focus position. The processing module 50 is electrically connected with the zoom lens 10, the image analyzing module 20, the focus distance providing module 30, and the algorithm module 40, and the processing module 50 is used for controlling the devices or the modules above-mentioned.

Figure 2:
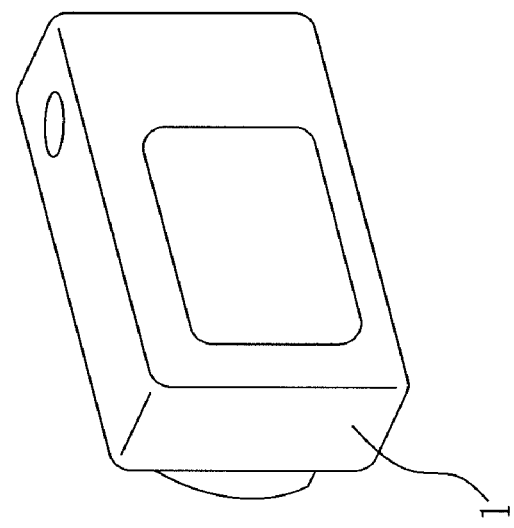
FIG. 2 illustrates a schematic drawing of a photographic device according to one embodiment of the present invention.
Figure 2:
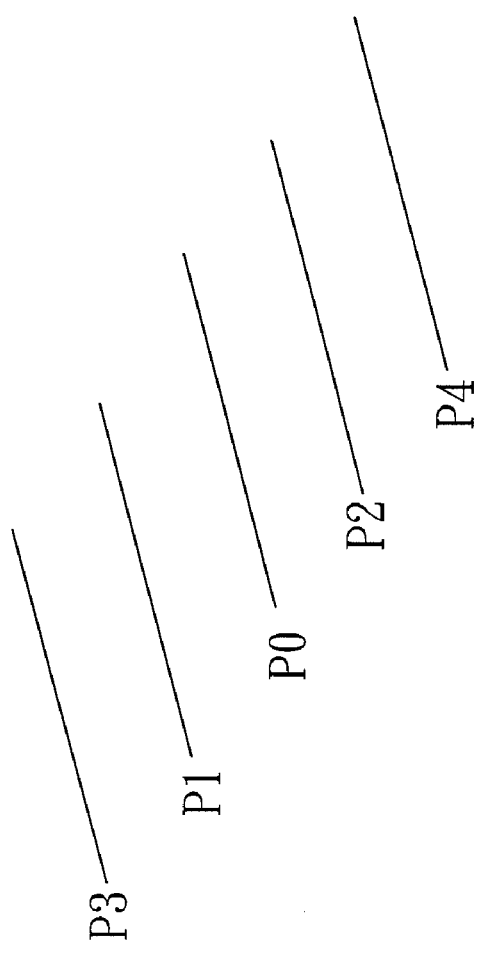

As shown in FIG. 2, in one embodiment of the present invention, the photographic device 1 is, but is not limited to, a digital camera. For example, the photographic device 1 of the present invention can also be a digital video camera, a camera phone, a personal digital assistant capable of capturing photos, or another photographic device capable of capturing photos.

The focus method performed by the photographic device 1 of the present invention as shown in FIG. 1 and FIG. 2 will be described hereinafter. Please note that the method of the invention is not limited to the photographic device 1 of the present invention as shown in FIG. 1 and FIG. 2. To be noted is that, in one embodiment of the present invention, the photographic device 1 applies, but is not limited to, an S0 continuous focus mode.

Figure 3:
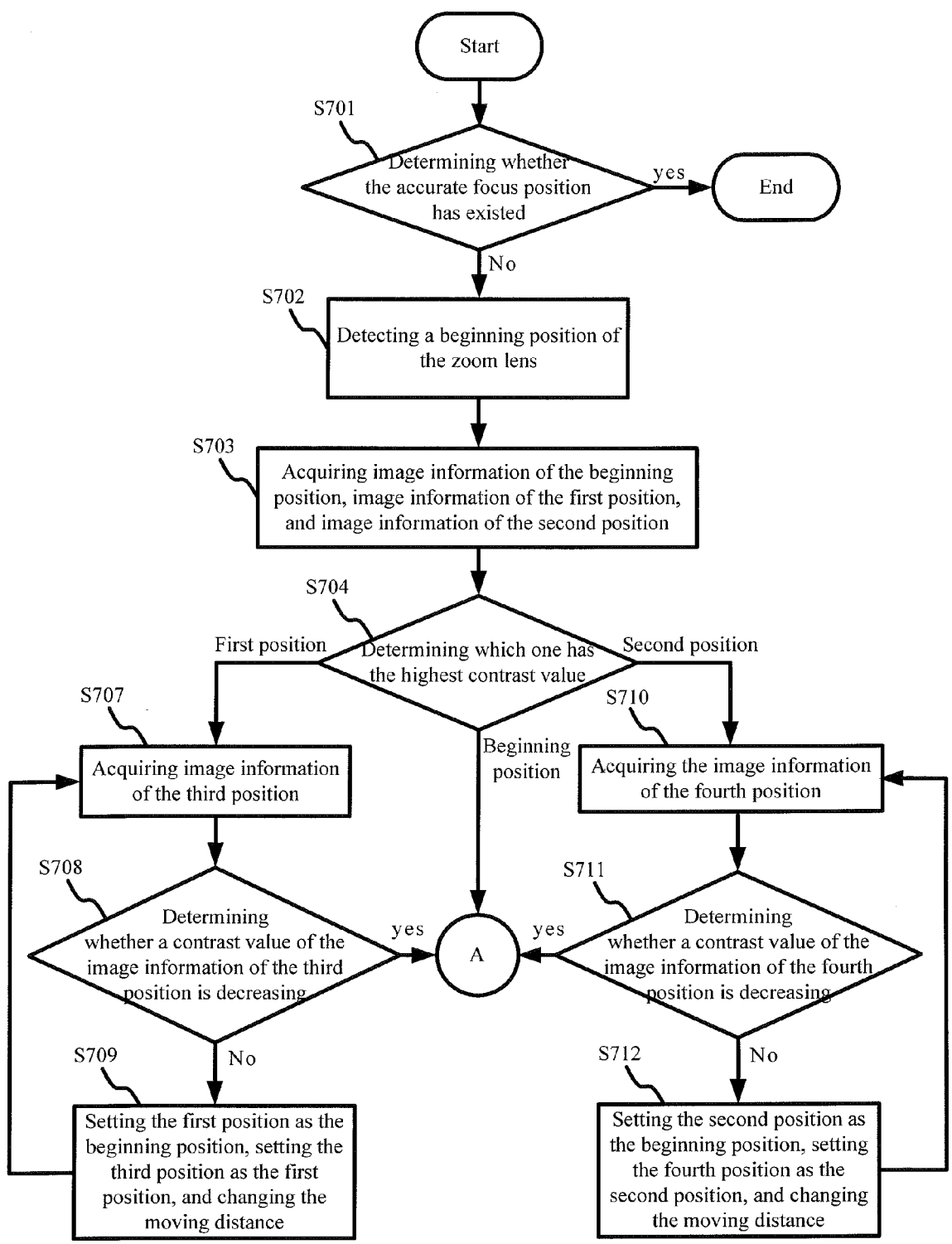
FIGS. 3~4 are flowcharts of a focus method according to one embodiment of the present invention.
Figure 4:
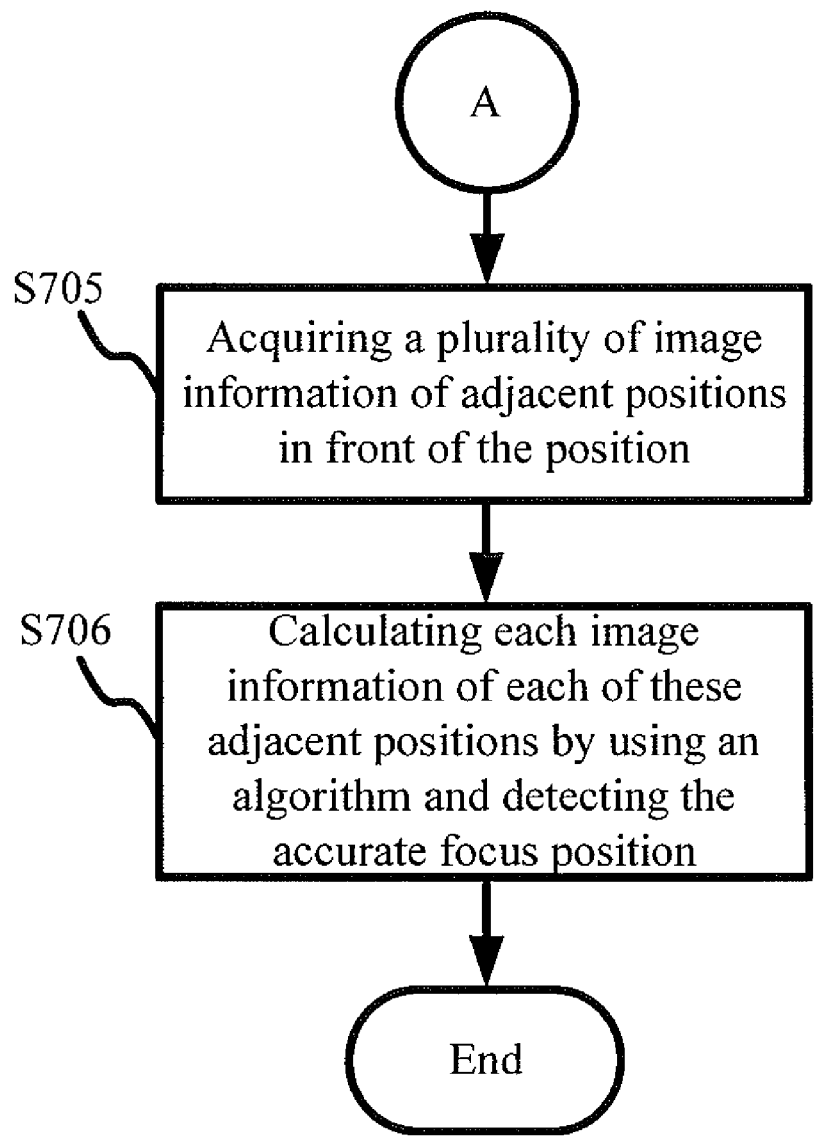

Please refer to FIGS. 1~4, which is one embodiment of the focus method. FIGS. 3~4 are flowcharts of the focus method according to one embodiment of the present invention.

As shown in FIG. 3, the present invention first performs step S701: determining whether the accurate focus position exists, and if yes, determining whether the accurate focus position has changed In one embodiment of the present invention, the accurate focus position is a focus position at which the zoom lens 10 can acquire the clearest image of a scene. In one embodiment of the present invention, the processing module 50 determines whether the zoom lens 10 has detected the accurate focus position of the scene before the photographic device 1 performs the continuous focus mode.

If the zoom lens 10 has not detected the accurate focus position or the accurate focus position has changed because the scene has changed or the photographic device 1 has moved, the present invention performs step S702: detecting a beginning position of the zoom lens.

As shown in FIG. 2, in one embodiment of the present invention, the processing module 50 detects the beginning position P0 of the zoom lens 10, and the beginning position P0 is the position of the zoom lens 10 before performing the continuous focus mode.

Then, the present invention performs step S703: acquiring image information of the beginning position, image information of the first position, and image information of the second position.

In one embodiment of the present invention, the zoom lens 10 is used for acquiring image information of the beginning position P0, image information of the first position P1, and image information of the second position P2. The first position P1 is relative to the beginning position P0 and away from the photographic device 1, and the second position P2 is relative to the beginning position P0 and close to the photographic device 1.

Then, the present invention performs step S704: determining which one has the highest contrast value among the image information of the beginning position, the image information of the first position, and the image information of the second position.

In one embodiment of the present invention, the image analyzing module 20 is used for analyzing contrast values of the image information of the beginning position P0, the first position P1, and the second position P2, and identifies which image information of these positions has the highest contrast value. In one embodiment of the present invention, the image analyzing module 20 uses, but is not limited to, the contrast value as clearness of the image of the scene, with a higher contrast value representing that the image is clearer.

As shown in FIG. 4, if the image information of the beginning position P0 has the highest contrast value, the present invention performs step S705: acquiring a plurality of image information of adjacent positions in front of the position.

In one embodiment of the present invention, if the image information of the beginning position P0 has the highest contrast value, the beginning position P0 is a coarse focus position, and the zoom lens 10 acquires a plurality of image information of adjacent positions in front of the beginning position P0. Each of the adjacent positions is substantially separated by a specific distance from each other, and the specific distance is set by, but is not limited to being set by, the manufacturer. For example, the specific distance can be set by a user as the user wishes.

Then, the present invention performs step S706: calculating each image information of each of these adjacent positions by using an algorithm and detecting the accurate focus position.

In one embodiment of the present invention, the algorithm module 40 is used for providing the algorithm and calculating the accurate focus position. The algorithm comprises a polynomial approximation method. The present invention substitutes these contrast values and these distances of each of the image information of these adjacent positions into the algorithm to acquire the accurate focus position. Because using the algorithm to acquire the accurate focus position is a known technique, there is no need to describe the calculation process in detail.

As shown in FIG. 3, in one embodiment of the present invention, if the image information of the first position P1 has the highest contrast value, the present invention performs step S707: acquiring image information of the third position.

As shown in FIG. 2, in one embodiment of the present invention, if the image information of the first position P1 has the highest contrast value, the zoom lens 10 acquires the image information of the third position P3. The third position P3 is away from the photographic device 1 and relative to the first position P1 away from a moving distance.

Then, the present invention performs step S708: determining whether a contrast value of the image information of the third position is decreasing.

In one embodiment of the present invention, the image analyzing module 20 is used for determining whether the contrast value of the image information of the first position P1 is lower than the contrast value of the image information of the third position P3.

In one embodiment of the present invention, if the contrast value of the image information of the third position P3 is decreasing, it represents that the accurate focus position is between the third position P3 and the first position P1. The third position P3 is a coarse focus position, and the zoom lens 10 acquires a plurality of image information of adjacent positions in front of the third position P3. For further description, the zoom lens 10 acquires the plurality of image information of adjacent positions between the third position P3 and the first position P1. Each of the adjacent positions is substantially separated by a specific distance from each other, and the specific distance is set by, but is not limited to being set by, the manufacturer.

In one embodiment of the present invention, if the contrast value of the image information of the third position P3 is increasing, the present invention performs step S709: setting the first position as the beginning position, setting the third position as the first position, and changing the moving distance.

In one embodiment of the present invention, if the contrast value of the image information of the third position P3 is increasing, it represents that the accurate focus position is farther than the third position P3, and the processing module 50 sets the first position P1 as the beginning position P0, and sets the third position P3 as the first position P1. The moving distance is to add an equal difference distance or a geometric distance. In one embodiment of the present invention, after step S709, the invention repeats step S707.

In one embodiment of the present invention, if the image information of the second position P2 has the highest contrast value, the present invention performs step S710: acquiring the image information of the fourth position.

In one embodiment of the present invention, if the image information of the second position P2 has the highest contrast value, the zoom lens 10 acquires the image information of the fourth position P4. The fourth position P4 is close to the photographic device 1 and relative to the second position P2 away from a moving distance.

Then, the present invention performs step S711: determining whether a contrast value of the image information of the fourth position is decreasing.

In one embodiment of the present invention, the image analyzing module 20 is used for determining whether the contrast value of the image information of the fourth position P4 is lower than the contrast value of the image information of the second position P2.

If the contrast value of the image information of the fourth position P4 is decreasing, the present invention performs step S705: acquiring a plurality of image information of adjacent positions in front of the position.

In one embodiment of the present invention, if the contrast value of the image information of the fourth position P4 is decreasing, it represents that the accurate focus position is between the fourth position P4 and the second position P2. The fourth position P4 is a coarse focus position, and the zoom lens 10 acquires a plurality of image information of adjacent positions in front of the fourth position P4. For further description, the zoom lens 10 acquires the plurality of image information of adjacent positions between the fourth position P4 and the second position P2. Each of the adjacent positions is substantially separated by a specific distance from each other, and the specific distance is set by, but is not limited to being set by, the manufacturer.

In one embodiment of the present invention, if the contrast value of the image information of the fourth position P4 is increasing, the present invention performs step S712: setting the second position as the beginning position, setting the fourth position as the second position, and changing the moving distance.

In one embodiment of the present invention, if the contrast value of the image information of the fourth position P4 is increasing, it represents that the accurate focus position is between the fourth position P4 and the photographic device 1, and the processing module 50 sets the second position P2 as the beginning position P0, and sets the fourth position P4 as the second position P2. The moving distance is to add an equal difference distance or a geometric distance. In one embodiment of the present invention, after step S712, the invention repeats step S710.

According to the focus method and the photographic device of the present invention, the photographic device acquires the image information of the plurality of positions by the non-equivalent focus distance interval, acquires a coarse focus position first, and acquires the accurate focus position by the constant focus distance according to the coarse focus position. Whereby, the non-equivalent focus distance interval is increased in the equal difference distance or the geometric distance, the photographic device can acquire the coarse focus position quickly, and the photographic device then acquires the accurate focus position by the constant focus distance precisely. The present method solves the defects of a long focus time generated by the zoom lens using the constant focus distance all the time in focusing in the prior art.

Although the present invention has been explained in relation to its preferred embodiments, it is to be understood that many other possible modifications and variations can be made without departing from the spirit and scope of the invention as hereinafter claimed.

What is claimed is:

1. A focus method for a photographic device having a zoom lens comprising:
   (a) detecting a beginning position of the zoom lens, wherein the beginning position is a position of the zoom lens before performing the focus method;
   (b) acquiring image information of the beginning position, image information of a first position, and image information of a second position with the zoom lens, wherein the first position is relative to the beginning position and away from the photographic device, and the second position is relative to the beginning position and close to the photographic device;
   (c) determining which one has the highest contrast value among the image information of the beginning position, the image information of the first position, and the image information of the second position;
   (d) if the image information of the beginning position has the highest contrast value, detecting an accurate focus position with the zoom lens according to the beginning position; and
   (e) if the image information of the first position has the highest contrast value, performing:
   acquiring a coarse focus position with a non-equivalent distance interval;
   (f) acquiring image information of a third position with the zoom lens, wherein the third position is away from the photographic device and relative to the first position away from a moving distance;
   (g) determining whether a contrast value of the image information of the third position is decreasing;
   (h) if the contrast value of the image information of the third position is decreasing, setting the third position as the coarse focus position for detecting the accurate focus position according to the coarse focus position; and
   (i) if the contrast value of the image information of the third position is increasing, setting the first position as the beginning position, setting the third position as the first position, and repeating (f) to (h) to acquire the coarse focus position, wherein the moving distance is to add a non-equivalent distance, wherein the non-equivalent distance is an equal difference distance or a geometric distance; and
   acquiring the accurate focus position with a constant distance interval;

(o) acquiring a plurality of image information of adjacent positions in front of the coarse focus position, wherein each of the adjacent positions is substantially separated by a specific distance from each other; and (p) calculating each image information of each of these adjacent positions by using an algorithm for detecting the accurate focus position.

2. The method as claimed in claim 1, wherein if the image information of the second position has the highest contrast value, performing:

acquiring the coarse focus position with the non-equivalent distance interval;

(k) acquiring image information of a fourth position with the zoom lens, wherein the fourth position is close to the photographic device and relative to the second position from the moving distance;

(l) determining whether a contrast value of the image information of the fourth position is decreasing;

(m) if the contrast value of the image information of the fourth position is decreasing, setting the fourth position as the coarse focus position for detecting the accurate focus position according to the coarse focus position; and (n) if the contrast value of the image information of the fourth position is increasing, setting the second position as the beginning position, setting the fourth position as the second position, and repeating (k) to (m) to acquire the coarse focus position; and acquiring the accurate focus position with the constant distance interval;

(q) acquiring a plurality of image information of adjacent positions in front of the coarse focus position, wherein each of the adjacent positions is substantially separated by the specific distance from each other; and (r) calculating each image information of each of these adjacent positions by using the algorithm for detecting the accurate focus position.

3. The method as claimed in claim 1, wherein before (a) further comprising:

(s) determining whether the accurate focus position exists, and if yes, determining whether the accurate focus position has changed; and (t) if the accurate focus position does not exist or the accurate focus position has changed, then performing (a).

4. The method as claimed in claim 1, wherein the method is used for an S0 continuous focus mode.

5. A photographic device comprising:

a zoom lens acquiring image information of a plurality of positions;

an image analyzing module analyzing contrast values of the image information of the plurality of positions;

a focus distance providing module providing a non-equivalent focus distance interval and a constant focus distance interval; and a processing module electrically connected with the zoom lens, the image analyzing module, and the focus distance providing module;

wherein when the processing module controls the focus lens to perform a focus operation, the zoom lens acquires the image information of the plurality of positions by the non-equivalent focus distance interval, acquires a coarse focus position, and acquires an accurate focus position by the constant focus distance according to the coarse focus position.

6. The photographic device as claimed in claim 5, further comprising:

an algorithm module electrically connected with the processing module;

wherein the algorithm module provides an algorithm and calculates the accurate focus position;

wherein the zoom lens acquires the plurality of image information of adjacent positions in front of the coarse focus position, wherein each of the adjacent positions is substantially separated by a specific distance from each other; and wherein the processing module controls the algorithm module and calculates the accurate focus position according to the algorithm and the plurality of image information of the adjacent positions.

7. The photographic device as claimed in claim 5, wherein the photographic device applies an S0 continuous focus mode.

* * * * *